United States Patent
Jing

(10) Patent No.: US 11,842,072 B2
(45) Date of Patent: Dec. 12, 2023

(54) DISTRIBUTED STORAGE METHOD AND APPARATUS, COMPUTER DEVICE, AND STORAGE MEDIUM

(71) Applicant: BAIDU ONLINE NETWORK TECHNOLOGY (BEIJING) CO., LTD., Beijing (CN)

(72) Inventor: Bo Jing, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 520 days.

(21) Appl. No.: 16/766,151

(22) PCT Filed: Jan. 18, 2019

(86) PCT No.: PCT/CN2019/072337
§ 371 (c)(1),
(2) Date: May 21, 2020

(87) PCT Pub. No.: WO2019/218717
PCT Pub. Date: Nov. 21, 2019

(65) Prior Publication Data
US 2020/0363994 A1   Nov. 19, 2020

(30) Foreign Application Priority Data
May 18, 2018 (CN) .......................... 201810479464.3

(51) Int. Cl.
G06F 3/06        (2006.01)
G06F 21/60       (2013.01)
(Continued)

(52) U.S. Cl.
CPC .......... *G06F 3/0659* (2013.01); *G06F 3/0604* (2013.01); *G06F 3/067* (2013.01);
(Continued)

(58) Field of Classification Search
CPC .... G06F 3/0659; G06F 3/0604; G06F 3/0644; G06F 3/0652; G06F 3/067; G06F 21/602; G06F 21/6209; H04L 9/3236; H04L 9/50
See application file for complete search history.

(56) References Cited

U.S. PATENT DOCUMENTS

2011/0016351 A1   1/2011   Turner et al.
2013/0111153 A1   5/2013   Lee
(Continued)

FOREIGN PATENT DOCUMENTS

CN   102148798 A   8/2011
CN   103559102 A   2/2014
(Continued)

OTHER PUBLICATIONS

Office Action for Chinese Application No. 201810479464.3, dated Jun. 23, 2020, 17 pages.
(Continued)

*Primary Examiner* — Lynn D Feild
*Assistant Examiner* — Vladimir I Gavrilenko
(74) *Attorney, Agent, or Firm* — Lippes Mathias LLP

(57) ABSTRACT

The present disclosure provides a distributed storage method, a computer device, and a storage medium. The method includes: grouping a file to be stored to form a plurality of data packets; dividing all the data packets into at least three data fragments, in which, each data fragment includes a part of the plurality of data packets, and each data packet is added to at least two data fragments; storing each data fragment in a distributed storage node to perform distributed storage; recording a corresponding relationship between the data fragments and the data packets and a corresponding relationship between storage nodes and the data fragments; and deleting the file to be stored in local.

17 Claims, 8 Drawing Sheets

(51) Int. Cl.
*G06F 21/62* (2013.01)
*H04L 9/32* (2006.01)
*H04L 9/00* (2022.01)

(52) U.S. Cl.
CPC .......... *G06F 3/0644* (2013.01); *G06F 3/0652* (2013.01); *G06F 21/602* (2013.01); *G06F 21/6209* (2013.01); *H04L 9/3236* (2013.01); *H04L 9/50* (2022.05)

(56) References Cited

U.S. PATENT DOCUMENTS

| | | | | |
|---|---|---|---|---|
| 2014/0369249 | A1* | 12/2014 | Mikhailov | H04W 4/06 370/312 |
| 2018/0145838 | A1* | 5/2018 | Wang | H04L 9/3278 |
| 2019/0180272 | A1* | 6/2019 | Douglas | H04L 67/1097 |
| 2019/0349426 | A1* | 11/2019 | Smith | H04L 67/562 |
| 2020/0097199 | A1* | 3/2020 | Ye | G06F 3/065 |

FOREIGN PATENT DOCUMENTS

| | | |
|---|---|---|
| CN | 104123300 A | 10/2014 |
| CN | 106302702 A | 1/2017 |
| CN | 106775494 A | 5/2017 |
| CN | 107220559 A | 9/2017 |
| CN | 107273410 A | 10/2017 |
| CN | 107273759 A | 10/2017 |
| CN | 108664223 A | 10/2018 |
| JP | 2000224158 A | 8/2000 |
| JP | 2012226544 A | 11/2012 |

OTHER PUBLICATIONS

Office Action for Japanese Application No. 2020-530626, dated Jul. 20, 2021, 3 pages.
Block Chain Application Development, dated Jan. 31, 2018, 5 pages.
Office Action for Chinese Application No. 201810479464.3, (English Translation—8 pages).
English Translation of International Search Report for PCT/CN2019/072337, dated Mar. 28, 2019, 6 pages.

* cited by examiner

DISTRIBUTED STORAGE METHOD AND APPARATUS, COMPUTER DEVICE, AND STORAGE MEDIUM

CROSS-REFERENCE TO RELATED APPLICATIONS

This application is a U.S. national phase of International Application No. PCT/CN2019/072337, which is based upon and claims priority to Chinese Patent Application No. 201810479464.3, filed on May 18, 2018, the entire contents of which are incorporated herein by reference.

FIELD

Embodiments of the present disclosure relate to a field of data storage technologies, and for example, to a distributed storage method and apparatus, a computer device, and a storage medium.

BACKGROUND

A cloud storage technology in the related art generally performs data storage through a centralized server. As more and more data is stored, storage space and bandwidth resources of the server are occupied seriously, and cloud storage costs are increased continuously. Moreover, data stored in the cloud through the cloud storage technology is unencrypted, and privacy of the data is endorsed by a credit of a large cloud storage service provider.

If a distributed storage technology is employed, decentralized storage for the data causes decentralization of the credit, which leads to a problem of insecure data storage caused by easy loss and vulnerability of unstable storage nodes.

SUMMARY

An embodiment of the present disclosure provides a distributed storage method. The method includes: grouping a file to be stored to form a plurality of data packets; dividing all the data packets into at least three data fragments, in which, each data fragment includes a part of the plurality of data packets, and each data packet is added to at least two data fragments; storing each data fragment in a distributed storage node to perform distributed storage; recording a corresponding relationship between the data fragments and the data packets and a corresponding relationship between storage nodes and the data fragments; and deleting the file to be stored in local.

Another embodiment of the present disclosure also provides a distributed storage apparatus. The apparatus includes: a data grouping module, a data fragment module, a data storing module, a relationship recording module, and a file deleting module. The data grouping module is configured to group a file to be stored, to form a plurality of data packets. The data fragment module is configured to divide all the data packets into at least three data fragments, in which, each data fragment includes a part of the plurality of data packets, and each data packet is added to at least two data fragments. The data storing module is configured to store each data fragment in a distributed storage node to perform distributed storage. The relationship recording module is configured to record a corresponding relationship between the data fragments and the data packets and a corresponding relationship between distributed storage nodes and the data fragments. The file deleting module is configured to delete the file to be stored in local.

Another embodiment of the present disclosure also provides a computer device. The computer device includes one or more processors, and a storage device. The storage device is configured to store one or more programs. When the one or more programs are executed by the one or more processors, the one or more processors are caused to implement the distributed storage method according to any one of embodiments of the present disclosure.

Another embodiment of the present disclosure also provides a computer readable storage medium having a computer program stored thereon. The computer program is configured to implement the distributed storage method according to any one of embodiments of the present disclosure when executed by a processor.

DETAILED DESCRIPTION

Detailed description will be further made below to the present disclosure with reference to the accompanying drawings and the embodiments. It should be understood that, embodiments described herein are intended only to explain the present disclosure, and are not intended to limit the present disclosure.

For convenience of description, the accompanying drawings merely illustrate some but not all of the contents related to the present disclosure. Before exemplary embodiments are discussed in more detail, it should be mentioned that some of the exemplary embodiments are described as processes or methods depicted as flow charts. Although the flow chart describes respective operations (or steps) as sequential processes, a plurality of them may be implemented in parallel, concurrently, or simultaneously. In addition, the order of respective operations may be rearranged. The process may be terminated when its operation is completed, but may also have additional steps not included in the accompanying drawings. The process may correspond to methods, functions, procedures, subroutines, subprograms, etc.

Embodiment 1

Figure 1:
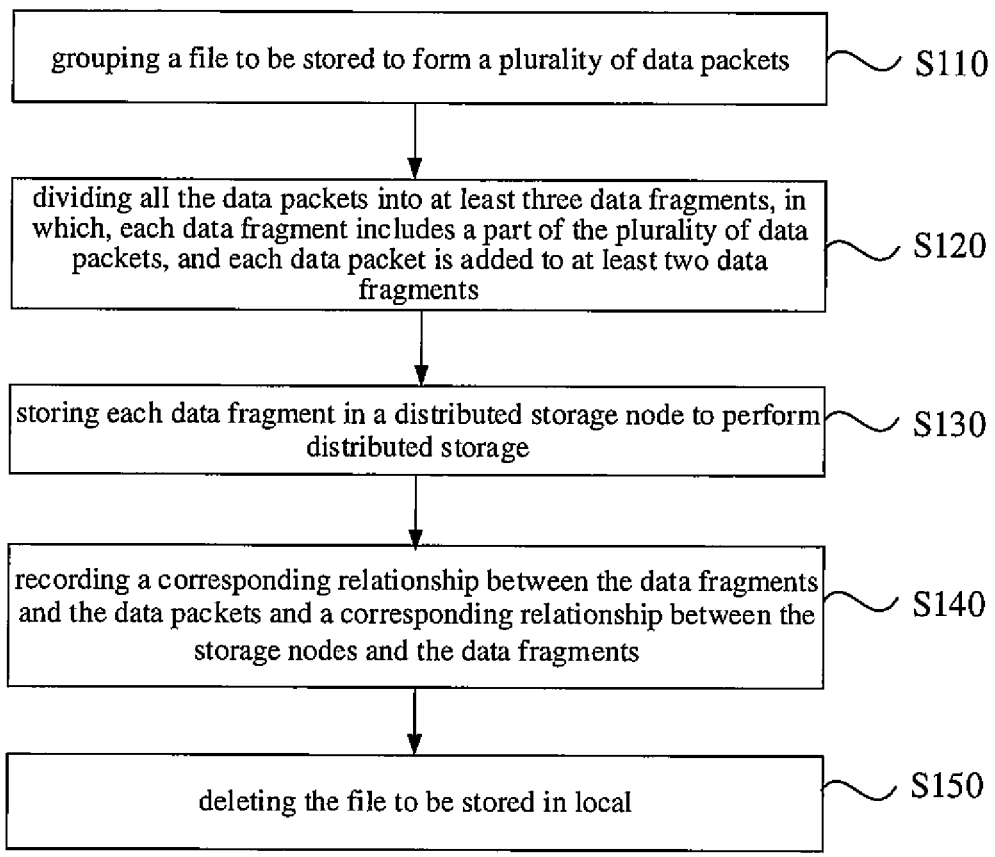
FIG. 1 is a flow chart illustrating a distributed storage method provided in Embodiment 1 of the present disclosure.

FIG. 1 is a flow chart illustrating a distributed storage method provided in Embodiment 1 of the present disclosure.

This embodiment may be applicable to a case where a file is stored in a distributed network. The method may be executed by a distributed storage apparatus. The apparatus may be implemented in form of software and/or hardware, and generally integrated in any computer device which may initiate data storage. As illustrated in FIG. 1, the method includes acts at blocks S110, S120, S130, S140, and S150.

At block S110, a file to be stored is grouped to form a plurality of data packets.

The file to be store may be a text, a picture, a video, an audio or other type of storable file (such as a compressed file in a zip format). The type of the file to be stored is not limited in embodiments of the present disclosure. A data packet may be a part of file data in the file to be stored.

In embodiments of the present disclosure, before distributed storage is performed on the file to be stored, the file to be stored is grouped into the plurality of data packets firstly. The file to be stored may be grouped by dividing the file to be stored into N data packets on average, such that each data packet includes file data with a same data amount. The file to be stored may also be grouped in a random dividing way, such that respective data packets include file data with different data amounts. Of course, the skilled in the art may establish other file grouping ways based on an actual requirement under a technical background of the technical solution herein, which is not limited in embodiments of the present disclosure.

At block S120, all the data packets are divided into at least three data fragments, in which, each data fragment includes a part of the plurality of data packets, and each data packet is added to at least two data fragments.

In embodiments of the present disclosure, the data fragment includes a part of the data packets, that is, each data fragment does not include all the data packets. The number of data packets included in each data fragment may be the same or different. For example, the number of data packets included in each data fragment may be 2, 5, 8 or more. Embodiments of the present disclosure does not limit the number of data packets included in each data fragment.

In order to improve security of the data storage, all the data packets may be formed into at least three data fragments, and it is ensured that each data packet may be added into at least two data fragments, that is, it is ensured that at least two storage copies are formed for each data packet. The data packets may be stored redundantly during grouping the data packet into the data fragments. For storing M copies, one data packet may appear at M data fragments. The number M of copies may be greater than or equal to 2, which may be preset or dynamically adjusted based on an actual condition such as an importance level of a storage file, a stability of a storage node.

At block S130, each data fragment is stored in a distributed storage node to perform distributed storage.

The storage nodes of the distributed network are nodes that work independently, and may be scheduled based on a distributed storage algorithm.

In embodiments of the present disclosure, the distributed storage may be performed on the data fragments formed by the data packets in distributed storage nodes, instead of storing the data packets formed by the file to be stored directly. Alternatively, each storage node may merely store one data fragment.

Correspondingly, performing the distributed storage on each data fragment in each storage node may employ a reed-solomon redundancy algorithm. Such algorithm corrects error data by a polynomial operation/an erasure code. Therefore, even if some storage nodes drop or data is damaged, a data file may still be successfully restored and accessed. For example, one file to be stored is divided into a plurality of data packets, and are distributed after formed into data fragments, M copies are redundantly stored on N storage nodes (such as, 30 storage nodes and 3 copies for storage), and each storage node stores a part of the data packets. As long as NIM storage nodes survive normally, the original file to be stored may be restored.

In an example, 3 copies may be employed for redundantly storage. When 30 storage nodes are used, as long as 10 storage nodes normally survive at the same time, an available storage service may be provided. It is assumed that a reliability of each storage node is only 50%, after a simple calculation, it may be concluded that a service stability of the distributed network is f=1−(1−70%)21, i.e., 99.99995%.

At block S140, a corresponding relationship between the data fragments and the data packets and a corresponding relationship between storage nodes and the data fragments are recorded.

With the corresponding relationship between the data fragments and the data packets, a corresponding data fragment may be found according to a data packet, and with the corresponding relationship between the storage nodes and the stored data fragments, a corresponding storage node may be found according to a stored data fragment, such that corresponding stored data fragment may be downloaded from a storage node. Meanwhile, verification of the data packets may be implemented based on the two corresponding relationships.

In embodiments of the present disclosure, privacy protection for the data packets and the data fragments may be implemented based on the corresponding relationship between the data fragments and the data packets, and the corresponding relationship between the storage nodes and the stored data fragments.

In an example, the corresponding relationship between the data fragments and the data packets may be that, a data fragment 1 includes data packets numbered 1, 2 and 3 respectively. The corresponding relationship between the storage nodes and the stored data fragments may be that, a storage node 5 stores the data fragment 1.

At block S150, the file to be stored in local is deleted.

Correspondingly, after each data fragment is stored and each corresponding relationship is recorded, the file to be stored in local may be deleted, to prevent the file to be stored from being obtained by an illegal attacker.

With embodiments of the present disclosure, the file to be stored is grouped to form the plurality of data packets, all the data packets are divided into the at least three data fragments, in which, each data fragment includes a part of the plurality of data packets, and each data packet is added to the at least two data fragments, and each data fragment is stored in the distributed storage node to perform the distributed storage, thereby implementing the distributed storage for the data. The distributed storage may solve a bottleneck problem of centralized storage, and reduce bandwidth costs and storage costs. In addition, unrecoverability of overall data due to failure of some storage nodes may be avoided by adopting multi-copy storage of the data packets. Moreover, since the data fragment stored in each storage node does not include all the data packets, it is impossible to restore the original storage file by attacking one storage node. The above technical solution solves problems of continuously increase in storage costs caused in a related cloud storage technology and unsafe data storage caused by a distributed storage technology, which is convenient for a user to store the file in the distributed network to reduce the storage costs, and may effectively improve the privacy and security of the storage file, thereby preventing the attacker from restoring the original file.

Embodiment 2

Figure 2A:
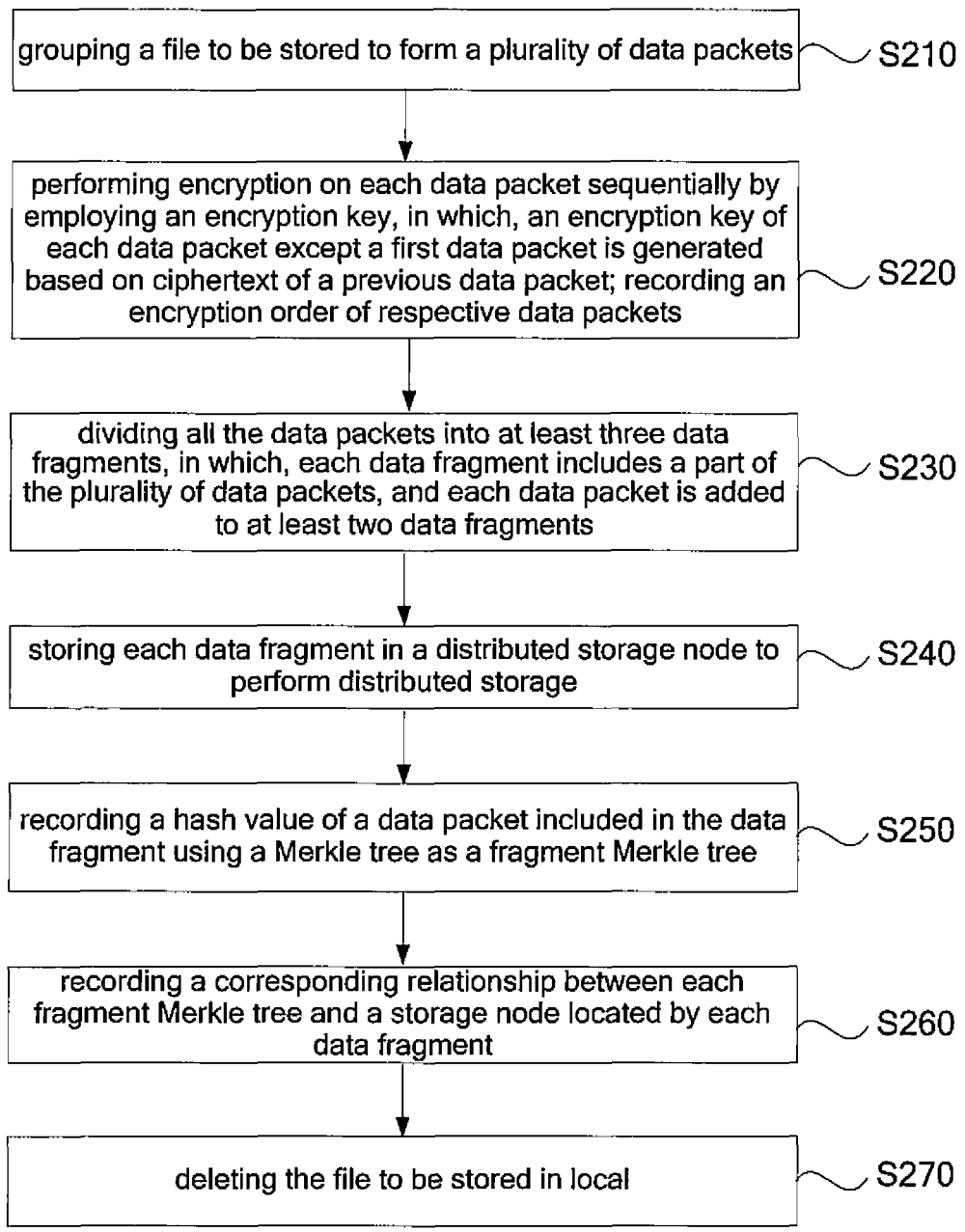
FIG. 2a is a flow chart illustrating a distributed storage method provided in Embodiment 2 of the present disclosure.

FIG. 2a is a flow chart illustrating a distributed storage method provided in Embodiment 2 of the present disclosure. This embodiment is refined based on the above embodiment. In this embodiment, an implementation for performing encryption on each data packet is described. Meanwhile, recording the corresponding relationship between the data fragments and the data packets and the corresponding relationship between the storage nodes and the data fragments is refined as: recording a hash value of a data packet included in the data fragment using a Merkle tree as a fragment Merkle tree; and recording a corresponding relationship between each fragment Merkle tree and a storage node located by each data fragment. Correspondingly, as illustrated in FIG. 2a, the method of this embodiment may include actions at block S210, block S220, block S230, block S240, block S250, block S260, and block S270.

At block S210, a file to be stored is grouped to form a plurality of data packets.

At block S220, encryption is performed on each data packet sequentially by employing an encryption key, in which, an encryption key of each data packet except a first data packet is generated based on ciphertext of a previous data packet, and an encryption order of respective data packets is recorded.

In embodiments of the present disclosure, in order to improve the security of the data packets, after the file to be stored is grouped, the encryption may be performed on each data packet. Alternatively, an encryption way for each data packet may be sequential encryption. That is, the encryption may be performed on each data packet by employing a symmetric encryption algorithm and a packet encryption mechanism, 128 bits of data may be encrypted symmetrically at a time, and an encryption key may reach 256 bits at most. The first data packet may be encrypted independently, and ciphertext corresponding to the first data packet is generated. When other data packets except the first data packet are encrypted, ciphertext of a previous data packet is taken as part of input to confuse an output of a following data packet. The ciphertext of the previous data packet may be employed to calculate and determine an encryption key of the following data packet. One part of the encryption key of the following data packet may include a fixed encryption key and the other part is determined by ciphertext calculation. Since a conventional CPU (central processing unit/ processor) does not optimize an instruction set for the packet encryption algorithm, brute force attack on the above sequential encryption method that relies on the previous data packet may require a huge attack price. In addition, even if the encryption key is leaked, content of a storage file may not be leaked, because only obtaining all the data packets and knowing about their encryption order, the attacker may decrypt the content of the storage file. After each data packet is sequentially encrypted with an encryption key, the encryption order of the respective data packets may also be recorded in order to facilitate restoring the original file to be stored later.

In an alternative embodiment of the present disclosure, recording the encryption order of respective data packets includes: calculating the hash value of each data packet based on the encryption order of the respective data packets to form an original Merkle tree.

Figure 2B:
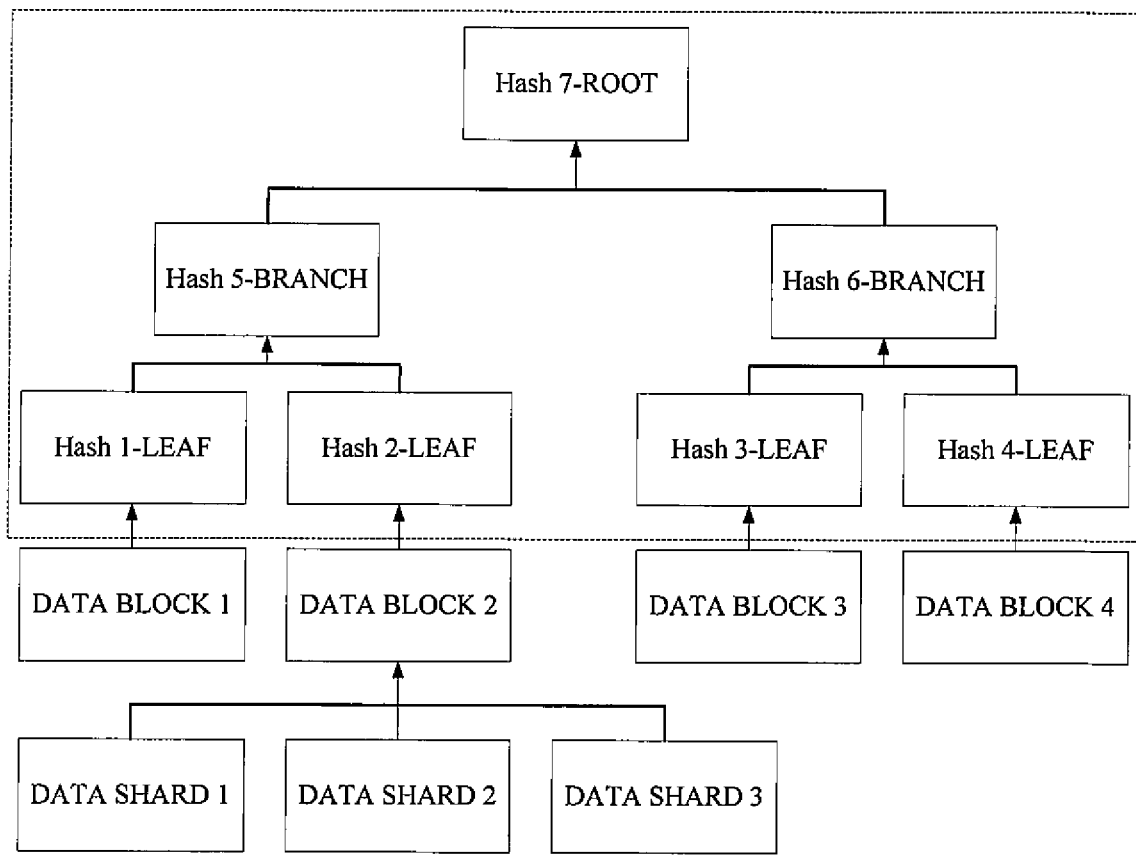
FIG. 2b is a schematic diagram illustrating an original Merkle tree related in Embodiment 2 of the present disclosure.

The original Merkle tree is a Merkle tree established on the basis of each hash value calculated based on each data packet. For example, FIG. 2b is a schematic diagram illustrating an original Merkle tree related in Embodiment 2 of the present disclosure. As illustrated in FIG. 2b, four data packets (DATA BLOCK) are included, the hash value of each data packet is calculated respectively, leaf nodes (Hash-LEAF) of the original Merkle tree are formed in an order from left to right, and each two leaf nodes are combined to calculate a hash value as an upper-layer branch (Hash-BRANCH) until a root node (Hash-ROOT) of the original Merkle tree is calculated. The original Merkle tree not only records the hash value of each data packet, but also records the order of the data packets in a tree structure. In the original Merkle tree, taking a second data packet (DATA BLOCK2) as an example, three data fragments (DATA SHARD 1, DATA SHARD2 and DATA SHARD3) at which the second data packet stored are also recorded.

Correspondingly, the encryption order of respective data packets may be recorded in the form of the Merkle tree, thus the operation efficiency and scalability of the distributed network may be improved by utilizing advantages of the Mekel tree, and it may be used as a verification credential for restoring data later.

At block S230, all the data packets are divided into at least three data fragments, in which, each data fragment includes a part of the plurality of data packets, and each data packet is added to at least two data fragments.

At block S240, each data fragment is stored in a distributed storage node for distributed storage.

At block S250, a hash value of a data packet included in the data fragment is recorded using a Merkle tree as a fragment Merkle tree.

The fragment Merkle tree is a Merkle tree established on the basis of each hash value calculated based on each data packet included in the data fragment.

In embodiments of the present disclosure, a structure of each data fragment may be recorded by using the Merkle tree. Since a sequence number ID (identity document) and a hash value of corresponding content are set for each data packet when the original Meckel tree is obtained, a corresponding fragment Meckel tree may be obtained for each data fragment by finally calculating the hash values of the data packets included in the data fragment. In the fragment Mekel tree, the order of respective data packets does not need to be the same as an original encryption order, and any two data packets may be combined to calculate a hash branch of the Mekel tree.

At block S260, a corresponding relationship between each fragment Merkle tree and a storage node located by each data fragment is recorded.

Correspondingly, after the fragment Merkle tree corresponding to each data fragment is obtained, the corresponding relationship between each fragment Merkle tree and the storage node located by each data fragment may be recorded. Each data fragment corresponds to one fragment Merkle tree.

In embodiments of the present disclosure, after the data packets are encrypted sequentially, the original Merkle tree is formed based on the hash value of each data packet, and the fragment Mekel tree is formed based on the hash value of each data packet included in the data fragment, thus data query and verification for the data packets and the data fragments may be realized, improving the privacy and security of the storage file, and effectively preventing the attacker from restoring the original file.

At block S270, the file to be stored in local is deleted.

With the technical solution of this embodiment, by encrypting the data packets sequentially, the difficulty of attacking the storage node to restore the original storage file is greatly increased, and the privacy of the distributed storage may be effectively improved.

Embodiment 3

Figure 3A:
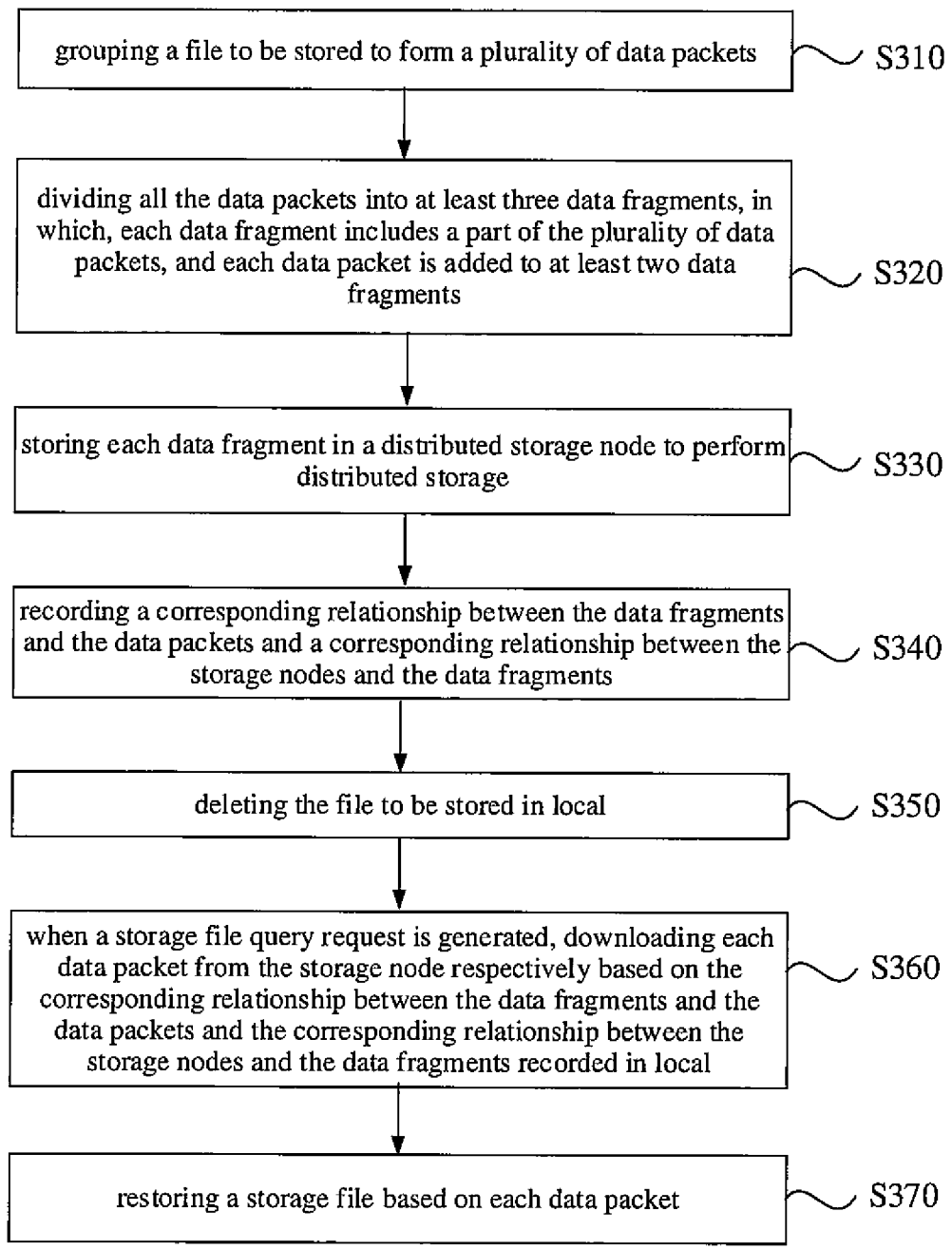
FIG. 3a is a flow chart illustrating a distributed storage method provided in Embodiment 3 of the present disclosure.
Figure 3B:
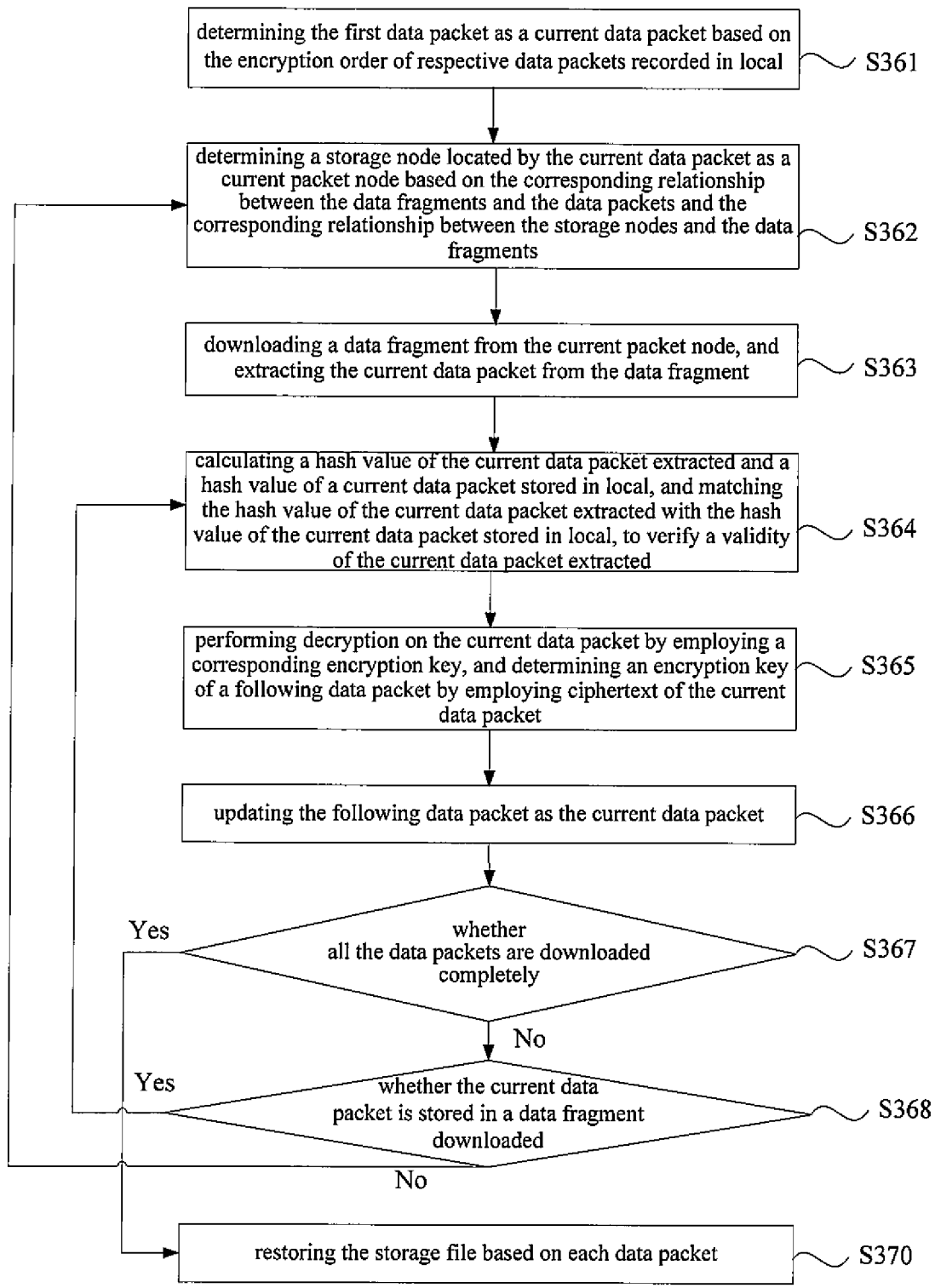
FIG. 3b is a flow chart illustrating a method for restoring a storage file in a distributed storage method provided in Embodiment 3 of the present disclosure.

FIG. 3a is a flow chart illustrating a distributed storage method provided in Embodiment 3 of the present disclosure. FIG. 3b is a flow chart illustrating a method for restoring a storage file in a distributed storage method provided in Embodiment 3 of the present disclosure. This embodiment is refined based on the above embodiments. In this embodiment, an implementation for restoring the storage file based on each data packet is described. Correspondingly, as illustrated in FIG. 3a, the method of this embodiment of the present disclosure may include actions at block S310, block S320, block S330, block S340, block S350, block S360, and block S370.

At block S310, a file to be stored is grouped to form a plurality of data packets.

At block S320, all the data packets are divided into at least three data fragments, in which each data fragment includes a part of the plurality of data packets, and each data packet is added to at least two data fragments.

At block S330, each data fragment is stored in a distributed storage node for distributed storage.

At block S340, a corresponding relationship between the data fragments and the data packets and a corresponding relationship between storage nodes and the data fragments are recorded.

At block S350, the file to be stored in local is deleted.

At block S360, when a storage file query request is generated, each data packet is downloaded from the storage node respectively based on the corresponding relationship between the data fragments and the data packets and the corresponding relationship between the storage nodes and the data fragments recorded in local.

The storage file query request may be a request sent by a user for obtaining the storage file, for example, for downloading the storage file or previewing the storage file online.

In embodiments of the present disclosure, during restoring the data, all the data packets corresponding to the storage file may be obtained sequentially based on the corresponding relationship between the data fragments and the data packets recorded in local, and the corresponding relationship between the storage nodes and the data fragments recorded in local, and each obtained data packet is spliced and decrypted in sequence to obtain a complete storage file.

Correspondingly, as illustrated in FIG. 3b, a procedure for restoring the storage file may include actions at block S361, block S362, block S363, block S364, block S365, block S366, block S367, and block S368.

At block S361, the first data packet is determined as a current data packet based on the encryption order of respective data packets recorded in local.

A data packet corresponding to a first hash node may be queried based on an original Merkle tree recorded in local.

At block S362, a storage node located by the current data packet is determined as a current packet node based on the corresponding relationship between the data fragments and the data packets and the corresponding relationship between the storage nodes and the data fragments.

A data fragment may be queried in the fragment Merkle tree based on a hash value corresponding to the first data packet, thus a corresponding storage node may be determined based on the queried data fragment.

At block S363, a data fragment is downloaded from the current packet node, and the current data packet is extracted from the data fragment.

During an encryption procedure of each data packet, the generation for an encryption key of each data packet is related to the ciphertext corresponding to a previous data packet. Therefore, the first data packet in the encryption order of the data packets may be directly obtained during a data restoring procedure, and then other data packets may be sequentially obtained based on the first data packet.

After the first data packet is determined, the first data packet is taken as the current data packet. A data fragment at which the current data packet locates is queried based on the corresponding relationship between the data fragments and the data packets. The storage node located by the current data packet is determined as the current packet node based on the corresponding relationship between the storage nodes and the data fragments. The data fragment is downloaded from the current packet node. The data fragment stored in the current packet node store includes the current data packet. Therefore, the current data packet may be extracted from the data fragment based on a hash position of a stored fragment Merkle tree corresponding to the current packet node.

For example, as illustrated in FIG. 2b, a tree composed of each hash value in the dotted line box is the original Meckel tree. The leaf nodes of the original Meckel tree, i.e., a Hash 1-LEAF, a Hash 2-LEAF, a Hash 3-LEAF, and Hash 4-LEAF, are hash values formed according to the order of the respective data packets. The branch nodes, i.e., a Hash 5-BRANCH and a Hash 6-BRANCH, are hash values calculated based on a hash algorithm according to each leaf node. The root node, i.e., a Hash 7-ROOT, is the root node of the original Meckel tree, and is also calculated based on the hash algorithm according to hash values corresponding to the Hash 5-BRANCH and the Hash 6-BRANCH. A DATA BLOCK 1, a DATA BLOCK 2, a DATA BLOCK 3, and a DATA BLOCK 4 are the data packets formed by the file to be stored. A DATA SHARD 1, a DATA SHARD 2, and a DATA SHARD 3 are a part of data fragments (that is, FIG. 2b does not illustrate all the data packets) formed by the data packets. Each of the part of data fragments include the second data packets. Correspondingly, a hash position corresponding to the first data packet (DATA BLOCK 1) is the Hash 1-LEAF node. By analogy, all the data packets store their hash values at corresponding hash positions.

FIG. 2b does not illustrate the structure of the fragment Merkle tree. The fragment Merkle tree is formed based on the hash values of the part of data packets included in the data fragment. Therefore, a leaf node (LEAF) of the fragment Merkle tree corresponds to a hash value formed by a data packet included in the leaf node, and the procedure for forming other nodes is the same as that of the original Merkle tree.

Correspondingly, when the second data packet (DATA BLOCK 2) is taken as the current data packet, a hash position corresponding to the current data packet in the original Merkle tree is the Hash 2-LEAF, and a hash value (such as H) stored in the Hash 2-LEAF may verify the hash value stored in the fragment Merkle tree. After the current data packet is determined, a storage node where the current data packet locates may be determined as the current packet node according to all the fragment Merkle trees and a corresponding relationship between each fragment Merkle tree and the storage node. There may be a plurality of storage nodes where the current data packet locates, and one of the plurality of storage nodes may be selected as the current packet node. A data packet corresponding to the hash value H is queried in a fragmented Merkel tree stored corresponding to the current packet node, which is the required second data packet.

It may be seen that, if the attacker wants to obtain the original file, the attacker may have to download all the data fragments based on data structures of the fragment Mekel trees corresponding to the data fragments, and master the encryption order of all the data packets, which is very difficult to do. Therefore, the distributed storage method of embodiments of the present disclosure may effectively prevent the attacker from obtaining the original file.

At block S364, a hash value of the current data packet extracted and a hash value of a current data packet stored in local are calculated, and the hash value of the current data packet extracted is matched with the hash value of the current data packet stored in local to verify a validity of the current data packet extracted.

In embodiments of the present disclosure, after the current data packet is obtained, the validity of the current data packet may be verified. Since different data packets correspond to different hash values, the hash value of the data packet may be used as a verification basis to match and verify the hash value of the current data packet with the hash value of the current data packet stored in local. When the verification is consistent, the verification is successful and the current data packet is valid; otherwise, another data fragment is selected and the current data packet is extracted according to the correspondence relationship between the data fragments and the data packets (e.g., using the fragment Merkel tree) until the extracted current data packet is determined to be valid.

At block S365, decryption is performed on the current data packet by employing a corresponding encryption key, and an encryption key of a following data packet is determined by employing ciphertext of the current data packet.

At block S366, the following data packet is updated as the current data packet.

Correspondingly, after the validity of the current data packet is determined, the decryption is performed on the current data packet by employing the encryption key corresponding to the current data packet. Since the encryption key of the first data packet is independent of other data packets, the first data packet may be decrypted directly with the corresponding encryption key. During decryption, the 128-bit or 256-bit encryption key obtained during the encryption may be used to decrypt the obtained data packet. After the decryption for the current data packet is completed, the encryption key of the following data packet is determined based on the ciphertext of the current data packet. Alternatively, the ciphertext of the first data packet may be combined with a set number of fixed characters to form the encryption key corresponding to the following data packet. Then, the following data packet is updated as the current data packet, and the following data packet is processed in the manner of downloading and verifying the current data packet.

At block S367, it is determined whether all the data packets are downloaded completely. If yes, actions at block S370 are executed; otherwise, actions at block S368 are executed.

In embodiments of the present disclosure, the storage file is formed by splicing and restoring the plurality of data packets. Therefore, only after all the data segments are obtained, the storage file may be obtained. When it is determined that all the data packets are downloaded completely, the storage file is restored and formed based on each data segment directly; otherwise, actions at block S368 are executed to continuously obtain missed data packets.

At block S368, it is determined whether the current data packet is stored in a data fragment downloaded. If yes, actions at block S364 are executed; otherwise, actions at block S362 are executed.

Since each data fragment includes a part of data packets, when one data fragment is downloaded, the data fragment includes not only the current data packet, but also other data packets that have been subjected to hash value verification processing or have not been subjected to the hash value verification processing. When the current data packet is included in a previously downloaded data fragment, there is no need to determine the storage node where the current data packet locates according to the corresponding relationship between the data fragments and the data packets and the corresponding relationship between the storage nodes and the stored data fragments or to download the corresponding data fragment. The hash value of the current data packet may be directly verified, and the current data packet may be decrypted according to the encryption key formed according to the ciphertext of the previous data packet.

For example, it is assumed that the current data packet is the second data packet, the part of data packets included in the data fragment downloaded at the current packet node are the first data packet, the second data packet, the fourth data packet, and the fifth data packet. The hash value verification processing is performed on the first data packet, but is not performed on the fourth data packet and the fifth data packet. When the fourth data packet or the fifth data packet is taken as the current data packet for processing, there is no need to download a corresponding data fragment. The fourth data packet or the fifth data packet included in the downloaded data fragment corresponding to the second data packet may be directly taken as the current data packet.

At block S370, the storage file is restored based on each data packet.

With embodiments of the present disclosure, each data packet is downloaded respectively from the storage node based on the corresponding relationship between the data fragments and the data packets recorded in local and the corresponding relationship between the storage nodes and the data fragments recorded in local, and the storage file is restored based on each data packet, which may effectively improve the privacy and security of the storage file, thus preventing the attacker from restoring the original file.

Embodiment 4

The distributed storage method provided by embodiments of the present disclosure may be applicable to each distributed network for data storage. In this embodiment, alternatively, a blockchain network is employed to perform distributed storage on a file to be stored. A blockchain system generally includes a plurality of nodes which work independently. On one hand, a node may be used independently as a node having a storage requirement for pre-storage preparation. On the other hand, a node may also be used as a storage node to accept a storage task requested by other nodes. The blockchain system is a decentralized network, and may perform cooperative work based on a consensus mechanism and other protocols.

Figure 4:
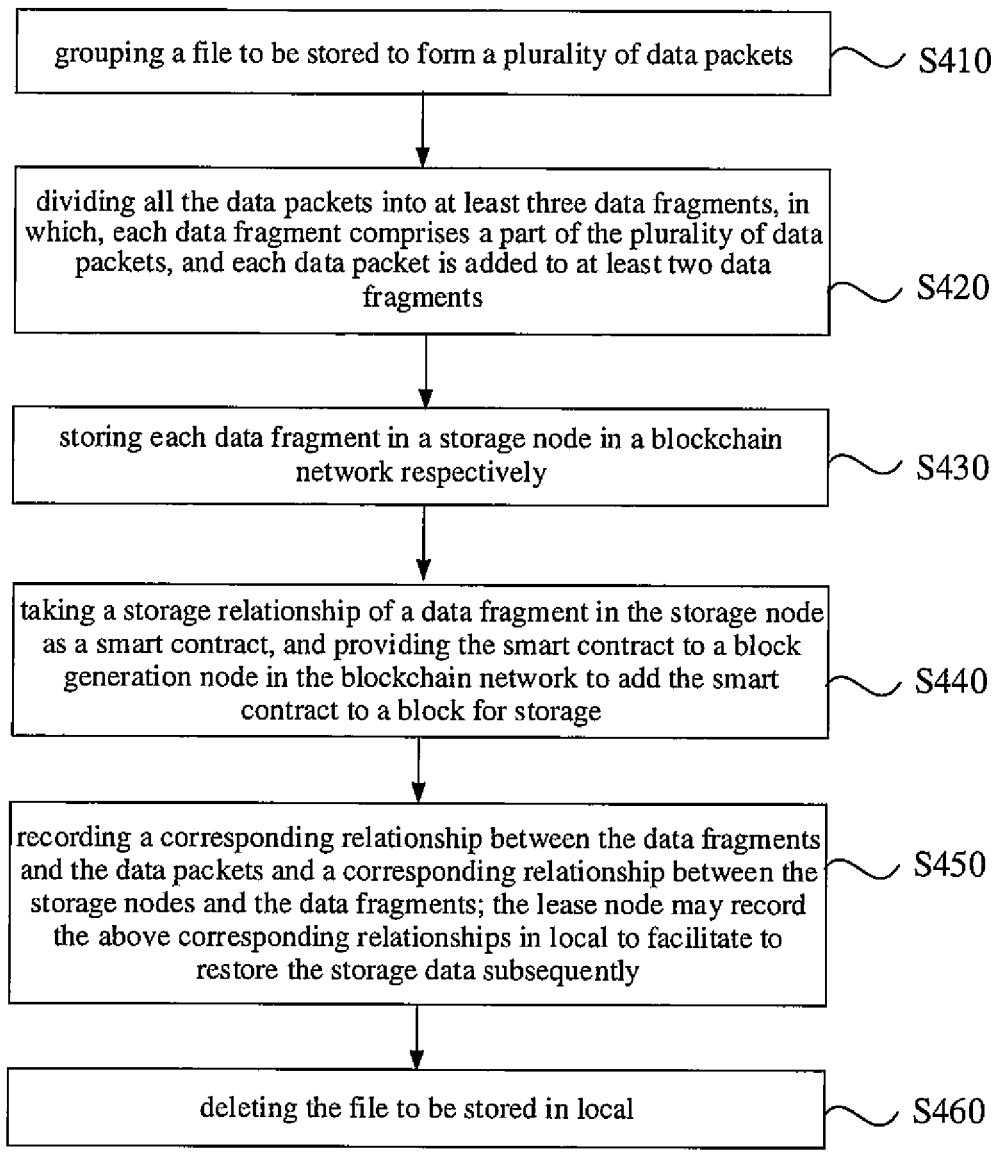
FIG. 4 is a flow chart illustrating a distributed storage method provided in Embodiment 4 of the present disclosure.

FIG. 4 is a flow chart illustrating a distributed storage method provided in Embodiment 4 of the present disclosure.

The method includes actions at block S410, block S420, block S430, block S440, block S450, and block S460.

At block S410, a file to be stored is grouped to form a plurality of data packets.

At block S420, all the data packets are divided into at least three data fragments, in which, each data fragment includes a part of the plurality of data packets, and each data packet is added to at least two data fragments.

At block S430, each data fragment is stored in a storage node in the blockchain network respectively.

A node or any electronic device generating a storage requirement may be a lease node, i.e., a node requesting to lease a storage space from other nodes. The lease node prepares fragmentation processing for the file before storing the file.

Meanwhile, the lease node also determines each storage node in the blockchain network to serve it, and each storage node may be also called as a lessee node. A procedure for determining the storage node may be an offline negotiation procedure, or may also be a smart contract that embodies a leasing procedure of the storage space issued in the blockchain network, and a node undertake the smart contract is called as the lessee node. After the storage node is determined, the lease node transmits the data fragment to the storage node for storing.

At block S440, a storage relationship of a data fragment in the storage node is taken as a smart contract, and the smart contract is provided to a block generation node in the blockchain network, to add the smart contract to a block for storage.

The above determined smart contract which embodies the leasing procedure of the storage space above is transmitted in the blockchain network. A block generation node that competes for and currently obtains a block processing authority may process the currently generated smart contract and package it to form a block. The block generation node may obtain a block generation authority based on a plurality of consensus mechanisms. Different lease nodes may generate different smart contracts within an authority period of the block generation node. The block generation node may process the smart contract. A processing way may include, but not limit to, performing verification, conversion, encryption, and storage, etc. on content of the smart contract. For example, when a storage space of other node is leased, a certain fee may be paid, and a corresponding payment amount may be reflected in the smart contract, which may be signed and confirmed by the lease node. The block generation node may transmit the payment amount from an account of the lease node to an account of the lessee node based on a regulation in the smart contract. The block generation node subsequently broadcasts the generated block to other nodes in the blockchain network for verification, and then the block is enable to go into effect and is added to a tail of the blockchain. A characteristic of the blockchain may ensure that the smart contract cannot be tampered with.

At block S450, a corresponding relationship between the data fragments and the data packets and a corresponding relationship between the storage nodes and the data fragments are recorded.

The lease node may record the above corresponding relationships in local to facilitate to restore the storage data subsequently.

At block S460, the local file to be stored is deleted.

In this application scene, the nodes in the distributed blockchain network may communicate with each other. Each node may become a lease node or a lessee node at any time. The lease node may upload the file to be stored, i.e. the lease node may be a node having a storage requirement. The lessee node may store a data fragment corresponding to the file, and may also be called as a storage node.

When a node (such as, a node representing a Baidu's network disk) has a lease requirement, that is, when the node requests other nodes on the blockchain network to store the file together, a preparation procedure for issuing the lease requirement is started. Then, the file to be stored may be firstly grouped at the node having the lease requirement to form the plurality of data packets, and each data packet is sequentially encrypted with an encryption key. The encryption key of each data packet except the first data packet is generated based on the ciphertext of a previous data packet. After performing the encryption on each data packet is completed, the hash value of each data packet may be calculated according to the encryption order of the data packets to form the original Meckel tree. Next, the node with the lease requirement forms the at least three data fragments by randomly combining any two data packets. Each data fragment includes a part of the data packets, and each data packet is added to at least two data fragments. Meanwhile, the node with the lease requirement records the hash value of each data packet included in the data fragment in the form of the Meckel tree as the fragment Meckel tree, and records the corresponding relationship between each fragment Meckel tree and a storage node where each data fragment locates. Finally, the node with the lease requirement transmits the data fragments to the storage nodes respectively to implement the transmission of the data fragments to the distributed blockchain network. After the storage for each data fragment is completed, a storage relationship of the data fragments in the storage nodes may be used as the smart contract and provided to the block generation node in the blockchain network, to add the smart contract to the blocks for storing.

It may be seen that the distributed storage method provided by embodiments of the present disclosure is applied to the field of blockchain technologies, and may facilitate the user to perform file storage in the distributed blockchain network and to reduce the storage costs, and may effectively improve the privacy and security of the storage file, thereby preventing the attacker from restoring the original file.

Embodiment 5

Figure 5:
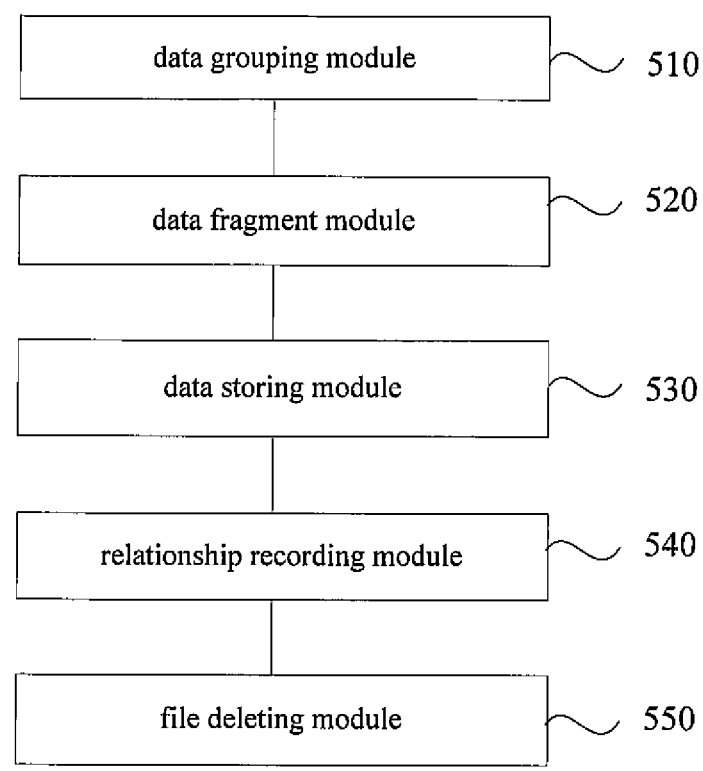
FIG. 5 is a block diagram illustrating a distributed storage apparatus provided in Embodiment 5 of the present disclosure.

FIG. 5 is a block diagram illustrating a distributed storage apparatus provided in Embodiment 5 of the present disclosure. As illustrated in FIG. 5, the apparatus includes a data grouping module 510, a data fragment module 520, a data storing module 530, a relationship recording module 540, and a file deleting module 550.

The data grouping module 510 is configured to group a file to be stored to form a plurality of data packets.

The data fragment module 520 is configured to divide all the data packets into at least three data fragments, in which, each data fragment includes a part of the plurality of data packets, and each data packet is added to at least two data fragments.

The data storing module 530 is configured to store each data fragment in a distributed storage node to perform distributed storage.

The relationship recording module 540 is configured to record a corresponding relationship between the data fragments and the data packets and a corresponding relationship between the distributed storage nodes and the data fragments.

The file deleting module 550 is configured to delete the file to be stored in local.

With embodiments of the present disclosure, the file to be stored is grouped to form the plurality of data packets, all the data packets are divided into the at least three data fragments, in which, each data fragment includes a part of the plurality of data packets, and each data packet is added to the at least two data fragments, and each data fragment is stored in the distributed storage node to perform the distributed storage, thereby implementing the distributed storage for the data. The distributed storage may solve a bottleneck problem of centralized storage, and reduce bandwidth costs and storage costs. In addition, unrecoverability of overall data due to failure of some storage nodes may be avoided by adopting multi-copy storage of the data packets. Moreover, since the data fragment stored in each storage node does not include all the data packets, it is impossible to restore the original storage file by attacking one storage node. The above technical solution solves problems of continuously increase in storage costs caused in a related cloud storage technology and unsafe data storage caused by a distributed storage technology, which is convenient for a user to store the file in the distributed network to reduce the storage costs, and may effectively improve the privacy and security of the storage file, thereby preventing the attacker from restoring the original file.

Alternatively, the apparatus further includes: a data encryption module, configured to perform encryption on each data packet sequentially by employing an encryption key, in which, an encryption key of each data packet except a first data packet is generated based on ciphertext of a previous data packet; and to record an encryption order of respective data packets.

Alternatively, the relationship recording module 540 is configured to record a hash value of a data packet included in the data fragment using a Merkle tree as a fragment Merkle tree; and to record a corresponding relationship between each fragment Merkle tree and a storage node located by each data fragment.

Alternatively, a data encryption module is configured to calculate the hash value of each data packet to form an original Merkle tree based on the encryption order of respective data packets.

Alternatively, the apparatus further includes a file restoring module, configured to, when a storage file query request is generated, download each data packet from the storage node respectively based on the corresponding relationship between the data fragments and the data packets and the corresponding relationship between the storage nodes and the data fragments; and to restore a storage file based on each data packet.

Alternatively, the file restoring module is configured to determine the first data packet as a current data packet based on the encryption order of respective data packets recorded in local; to determine a storage node located by the current data packet as a current packet node based on the corresponding relationship between the data fragments and the data packets and the corresponding relationship between the storage nodes and the data fragments; to download a data fragment from the current packet node, and to extract the current data packet from the data fragment; to perform decryption on the current data packet by employing a corresponding encryption key, and to determine an encryption key of a following data packet by employing ciphertext of the current data packet; to update the following data packet as the current data packet; when the current data packet is stored in the data fragment downloaded, to return to perform the decryption; and when the current data packet is not stored in the data fragment downloaded, to return to determine the current packet node until all the data packets are downloaded.

Alternatively, the file restoring module is configured to calculate a hash value of a current data packet extracted and a hash value of the current data packet stored in local, and to match the hash value of the current data packet extracted with the hash value of the current data packet stored in local, to verify a validity of the current data packet extracted.

Alternatively, the data storage module 530 is configured to store each data fragment in a storage node in a blockchain network respectively; and to take a storage relationship of a data fragment in the storage node as a smart contract, and to provide the smart contract to a block generation node in the blockchain network, to add the smart contract to a block for storage.

The above distributed storage apparatus may execute the distributed storage method according to any of embodiments of the present disclosure, and has the function modules and advantageous effects corresponding to the method. The technical details not described in this embodiment may be referred to the distributed storage method according to any of embodiments of the present disclosure.

Embodiment 6

Figure 6:
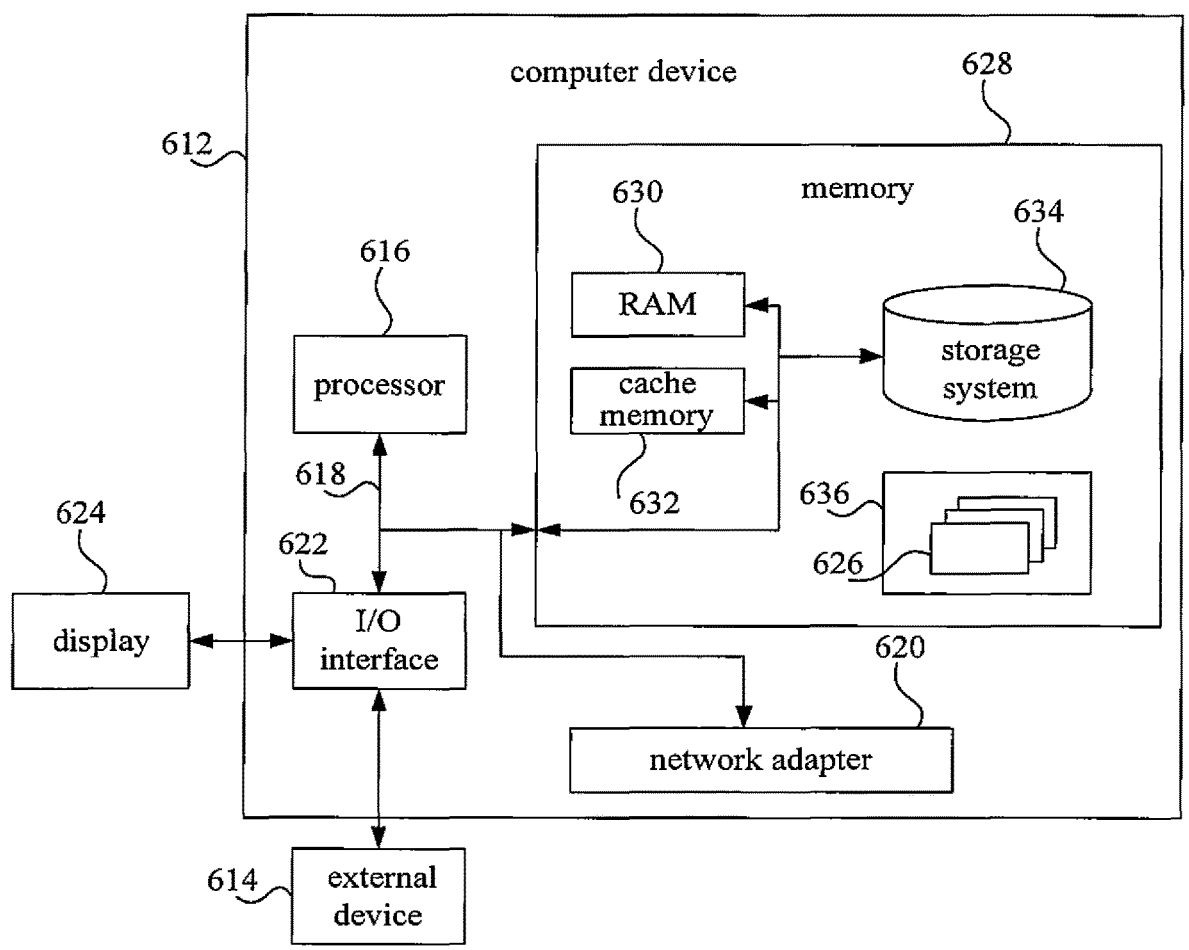
FIG. 6 is a block diagram illustrating a computer device provided in Embodiment 6 of the present disclosure.

FIG. 6 is a block diagram illustrating a computer device provided in Embodiment 6 of the present disclosure. FIG. 6 illustrates a block diagram of a computer device 612 applicable to implement implementations of the present disclosure. The computer device 612 illustrated in FIG. 6 is only an example, which may not bring any limitation to functions and scope of embodiments of the present disclosure.

As illustrated in FIG. 6, the computer device 612 is presented in form of a general-purpose computing device. Components of the computer device 612 may include but be not limited to: one or more processors 616, a storage device 628, and a bus 618 connecting different system components (including the storage device 628 and the processor 616).

The bus 618 represents one or more of several bus structures, including a storage bus or a memory controller, a peripheral bus, an accelerated graphics port, a processor, or a local bus using any bus structure in the plurality of bus structures. For example, these architectures include, but are not limited to, an industry standard architecture (ISA) bus, a micro channel architecture (MCA) bus, an enhanced ISA bus, a video electronics standards association (VESA) local bus and a peripheral component interconnection (PCI) bus.

The computer device 612 typically includes a plurality of computer system readable mediums. These mediums may be any usable medium that may be accessed by the computer device 612, including volatile and non-volatile mediums, removable and non-removable mediums.

The storage device 628 may include computer system readable mediums in the form of volatile medium, such as a random-access memory (RAM) 630 and/or a cache memory 632. The computer device 612 may further include other removable/non-removable, volatile/non-volatile computer system storage mediums. Only as an example, the storage system 634 may be configured to read from and write to non-removable, non-volatile magnetic mediums (not illustrated in FIG. 6, and usually called "a hard disk driver"). Although not illustrated in FIG. 6, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected to the bus 618 by one or more data medium interfaces. The storage 628 may include at least one program product. The program product has a set of program modules (for example, at least one program module), and these program modules are configured to execute functions of respective embodiments of the present disclosure.

A program 636, having a set (at least one) of program modules 626, may be stored in the storage 628. Such program modules 626 include, but not are limited to, an operating system, one or more application programs, other program modules, and program data. Each or any combination of these examples may include an implementation of a networking environment. The program module 626 usually executes functions and/or methods described in embodiments of the present disclosure.

The computer device 612 may communicate with one or more external devices 614 (such as a keyboard, a pointing device, and a display 624), may also communicate with one or more devices enabling a user to interact with the computer device 612, and/or may communicate with any device (such as a network card, and a modem) enabling the computer device 612 to communicate with one or more other computing devices. Such communication may occur via an input/output (I/O) interface 622. Moreover, the computer device 612 may further communicate with one or more networks (such as local area network (LAN), wide area network (WAN) and/or public network, such as Internet) via a network adapter 620. As illustrated in FIG. 6, the network adapter 620 communicates with other modules of the computer device 612 via the bus 618. It should be understood that, although not illustrated in FIG. 6, other hardware and/or software modules may be used in combination with the computer device 612, including but being not limited to: microcode, device drivers, redundant processing units, external disk drive arrays, RAID (redundant array of independent disks) systems, tape drives, and data backup storage systems, etc.

The processor 616, by operating programs stored in the storage device 628, executes various function applications and data processing, for example implements a distributed storage method provided in embodiments of the present disclosure.

That is, the processor executes the program to implement: grouping a file to be stored to form a plurality of data packets; dividing all the data packets into at least three data fragments, in which, each data fragment includes part of data packets, and each data packet is added to at least two data fragments; storing each data fragment in a distributed storage node to perform distributed storage; recording a corresponding relationship between the data fragments and the data packets and a corresponding relationship between the storage nodes and the data fragments; and deleting the file to be stored in local.

By the computer device, the file to be stored is grouped to form the plurality of data packets, all the data packets are divided into the at least three data fragments, in which, each data fragment includes a part of the plurality of data packets, and each data packet is added to the at least two data fragments, and each data fragment is stored in the distributed storage node to perform the distributed storage, thereby implementing the distributed storage for the data. The distributed storage may solve a bottleneck problem of centralized storage, and reduce bandwidth costs and storage costs.

In addition, unrecoverability of overall data due to failure of some storage nodes may be avoided by adopting multi-copy storage of the data packets. Moreover, since the data fragment stored in each storage node does not include all the data packets, it is impossible to restore the original storage file by attacking one storage node. The above technical solution solves problems of continuously increase in storage costs caused in a related cloud storage technology and unsafe data storage caused by a distributed storage technology, which is convenient for a user to store the file in the distributed network to reduce the storage costs, and may effectively improve the privacy and security of the storage file, thereby preventing the attacker from restoring the original file.

Embodiment 7

Embodiment 7 of the present disclosure also provides a computer readable storage medium having a computer program stored thereon. The computer program is configured to implement the distributed storage method according to any of embodiments of the present disclosure when executed by a computer processor. The method includes: grouping a file to be stored to form a plurality of data packets; dividing all the data packets into at least three data fragments, in which, each data fragment includes part of data packets, and each data packet is added to at least two data fragments; storing each data fragment in a distributed storage node to perform distributed storage; recording a corresponding relationship between the data fragments and the data packets, and a corresponding relationship between the storage nodes and the data fragments; and deleting the file to be stored in local.

The computer storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory, an optical memory device, a magnetic memory device, or any appropriate combination of the foregoing. In this document, the computer readable storage medium may be any tangible medium that contains or stores a program. The program may be used by or in conjunction with an instruction execution system, apparatus or device.

The computer readable signal medium may include a data signal transmitted in the baseband or as a part of a carrier, in which computer readable program codes are carried. The transmitted data signal may employ a plurality of forms, including but not limited to, an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network or a wide area network, or may be connected to an external computer (for example, through the Internet using an Internet service provider).

What is claimed is:

1. A distributed storage method, comprising:
grouping a file to be stored to form a plurality of data packets;
performing encryption on each data packet sequentially by employing an encryption key, wherein, an encryption key of each data packet except a first data packet is generated based on ciphertext of a previous data packet;
recording an encryption order of respective data packets;
dividing all the data packets into at least three data fragments, wherein, each data fragment comprises a part of the plurality of data packets, and each data packet is added to at least two data fragments, so that at least two storage copies are formed for each data packet;
storing each data fragment in a distributed storage node to perform distributed storage by employing a redundancy algorithm, wherein a plurality of redundant storages are formed for the data fragments;
recording a corresponding relationship between the data fragments and the data packets and a corresponding relationship between storage nodes and the data fragments, such that verification of the data packets and privacy protection for the data packets and the data fragments are implemented based on the two corresponding relationships; and
deleting the file to be stored in local.

2. The method of claim 1, wherein recording the corresponding relationship between the data fragments and the data packets and the corresponding relationship between the storage nodes and the data fragments comprises:
recording a hash value of a data packet comprised in the data fragment using a Merkle tree as a fragment Merkle tree; and
recording a corresponding relationship between each fragment Merkle tree and a storage node where each data fragment is located.

3. The method of claim 1, wherein recording the encryption order of respective data packets comprises:
calculating a hash value of each data packet based on the encryption order of respective data packets to form an original Merkle tree.

4. The method of claim 1, further comprising:

when a storage file query request is generated, downloading each data packet from the storage node respectively based on the corresponding relationship between the data fragments and the data packets and the corresponding relationship between the storage nodes and the data fragments recorded in local; and
restoring a storage file based on each data packet.

5. The method of claim 4, wherein downloading each data packet from the storage node respectively based on the corresponding relationship between the data fragments and the data packets and the corresponding relationship between the storage nodes and the data fragments recorded in local comprises:
determining the first data packet as a current data packet based on the encryption order of respective data packets recorded in local;
determining a storage node where the current data packet is located as a current packet node based on the corresponding relationship between the data fragments and the data packets and the corresponding relationship between the storage nodes and the data fragments;
downloading a data fragment from the current packet node, and extracting the current data packet from the data fragment;
performing decryption on the current data packet by employing a corresponding encryption key, and determining an encryption key of a following data packet by employing ciphertext of the current data packet;
updating the following data packet as the current data packet;
when the current data packet is stored in the data fragment downloaded, returning to perform the decryption; and
when the current data packet is not stored in the data fragment downloaded, returning to perform determining the current packet node until all the data packets are downloaded.

6. The, method of claim 5, before performing decryption on the current data packet by employing the corresponding encryption key, further comprising:
calculating a hash value of the current data packet extracted and a hash value of a current data packet stored in local, and matching the hash value of the current data packet extracted with the hash value of the current data packet stored in local to verify a validity of the current data packet extracted.

7. The method of claim 1, wherein storing each data fragment in the distributed storage node to perform distributed storage comprises:
storing each data fragment in a storage node in a blockchain network respectively; and
taking a storage relationship of a data fragment in the storage node as a smart contract, and providing the smart contract to a block generation node in the blockchain network, to add the smart contract to a block for storage.

8. A computing device, comprising:
one or more processors; and
a storage device, configured to store one or more programs,
wherein when the one or more programs are executed by the one or more processors, the one or more processors are caused to implement a distributed storage method, the method comprises:
grouping a file to be stored to form a plurality of data packets;
performing encryption on each data packet sequentially by employing an encryption key, wherein, an encryption key of each data packet except a first data packet is generated based on ciphertext of a previous data packet;

recording an encryption order of respective data packets;

dividing all the data packets into at least three data fragments, wherein, each data fragment comprises a part of the plurality of data packets, and each data packet is added to at least two data fragments, so that at least two storage copies are formed for each data packet;

storing each data fragment in a distributed storage node to perform distributed storage by employing a redundancy algorithm, wherein a plurality of redundant storages are formed for the data fragments;

recording a corresponding relationship between the data fragments and the data packets and a corresponding relationship between storage nodes and the data fragments, such that verification of the data packets and privacy protection for the data packets and the data fragments are implemented based on the two corresponding relationships; and deleting the file to be stored in local.

9. A non-transitory computer readable medium having a computer program stored thereon that, when executed by a processor, a distributed storage method is implemented, the method comprising:

grouping a file to be stored to form a plurality of data packets;

performing encryption on each data packet sequentially by employing an encryption key, wherein, an encryption key of each data packet except a first data packet is generated based on ciphertext of a previous data packet;

recording an encryption order of respective data packets;

dividing all the data packets into at least three data fragments, wherein, each data fragment comprises a part of the plurality of data packets, and each data packet is added to at least two data fragments, so that at least two storage copies are formed for each data packet;

storing each data fragment in a distributed storage node to perform distributed storage by employing a redundancy algorithm, wherein a plurality of redundant storages are formed for the data fragments;

recording a corresponding relationship between the data fragments and the data packets and a corresponding relationship between storage nodes and the data fragments, such that verification of the data packets and privacy protection for the data packets and the data fragments are implemented based on the two corresponding relationships; and deleting the file to be stored in local.

10. The computing device of claim 8, wherein recording the corresponding relationship between the data fragments and the data packets and the corresponding relationship between the storage nodes and the data fragments comprises:

recording a hash value of a data packet comprised in the data fragment using a Merkle tree as a fragment Merkle tree; and recording a corresponding relationship between each fragment Merkle tree and a storage node where each data fragment is located.

11. The computing device of claim 8, wherein recording the encryption order of respective data packets comprises:

calculating a hash value of each data packet based on the encryption order of respective data packets to form an original Merkle tree.

12. The computing device of claim 8, wherein, the method further comprises:

when a storage file query request is generated, downloading each data packet from the storage node respectively based on the corresponding relationship between the data fragments and the data packets and the corresponding relationship between the storage nodes and the data fragments recorded in local; and restoring a storage file based on each data packet.

13. The computing device of claim 12, wherein downloading each data packet from the storage node respectively based on the corresponding relationship between the data fragments and the data packets and the corresponding relationship between the storage nodes and the data fragments recorded in local comprises:

determining the first data packet as a current data packet based on the encryption order of respective data packets recorded in local;

determining a storage node where the current data packet is located as a current packet node based on the corresponding relationship between the data fragments and the data packets and the corresponding relationship between the storage nodes and the data fragments;

downloading a data fragment from the current packet node, and extracting the current data packet from the data fragment;

performing decryption on the current data packet by employing a corresponding encryption key, and determining an encryption key of a following data packet by employing ciphertext of the current data packet;

updating the following data packet as the current data packet;

when the current data packet is stored in the data fragment downloaded, returning to perform the decryption; and when the current data packet is not stored in the data fragment downloaded, returning to perform determining the current packet node until all the data packets are downloaded.

14. The computing device of claim 13, wherein, before performing decryption on the current data packet by employing the corresponding encryption key, the method further comprises:

calculating a hash value of the current data packet extracted and a hash value of a current data packet stored in local, and matching the hash value of the current data packet extracted with the hash value of the current data packet stored in local to verify a validity of the current data packet extracted.

15. The computing device of claim 8, wherein storing each data fragment in the distributed storage node to perform distributed storage comprises:

storing each data fragment in a storage node in a blockchain network respectively; and taking a storage relationship of a data fragment in the storage node as a smart contract, and providing the smart contract to a block generation node in the blockchain network, to add the smart contract to a block for storage.

16. The non-transitory computer readable medium of claim 9, wherein recording the corresponding relationship between the data fragments and the data packets and the corresponding relationship between the storage nodes and the data fragments comprises:

recording a hash value of a data packet comprised in the data fragment using a Merkle tree as a fragment Merkle tree; and recording a corresponding relationship between each fragment Merkle tree and a storage node where each data fragment is located.

17. The non-transitory computer readable medium of claim 9, wherein recording the encryption order of respective data packets comprises:

calculating a hash value of each data packet based on the encryption order of respective data packets to form an original Merkle tree.

\* \* \* \* \*